(12) United States Patent
Hama

(10) Patent No.: US 7,016,063 B2
(45) Date of Patent: Mar. 21, 2006

(54) PRINTING APPARATUS, PRINTING SYSTEM, AND PRINT JOB CONTROLLING METHOD AND PROGRAM PRODUCT

(75) Inventor: Kenro Hama, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 1365 days.

(21) Appl. No.: 09/735,622

(22) Filed: Dec. 14, 2000

(65) Prior Publication Data

US 2002/0051171 A1    May 2, 2002

(30) Foreign Application Priority Data

Dec. 14, 1999  (JP)  ................................. 11-354723

(51) Int. Cl.
   *G06F 13/00*   (2006.01)
   *G06F 3/12*    (2006.01)

(52) U.S. Cl. ..................................... 358/1.15; 358/1.14

(58) Field of Classification Search ........ 358/1.1–1.18; 709/224, 223, 228, 229; 710/7–10, 19, 31, 710/33–34
   See application file for complete search history.

(56) References Cited

U.S. PATENT DOCUMENTS

| | | | | |
|---|---|---|---|---|
| 5,956,698 A | * | 9/1999 | Lacheze et al. | ............... 705/34 |
| 6,665,716 B1 | * | 12/2003 | Hirata et al. | ............... 709/224 |
| 6,762,857 B1 | * | 7/2004 | Salgado et al. | .............. 358/1.9 |

FOREIGN PATENT DOCUMENTS

| | | |
|---|---|---|
| JP | 09-212318 | 8/1997 |
| JP | 11-203093 | 7/1999 |

* cited by examiner

*Primary Examiner*—Douglas Q. Tran
(74) *Attorney, Agent, or Firm*—Buchanan Ingersoll PC

(57) ABSTRACT

A printing apparatus capable of easily and reliably preventing execution of an unnecessary print job due to a user's misoperation or the like. According to the printing apparatus, when the same print job is successively transmitted from an external device such as a personal computer in a short time, it is determined that the transmitted print job is a print job requiring confirmation as to whether to execute or not, and information for the confirmation is transmitted to the external device.

16 Claims, 5 Drawing Sheets

PRINTING APPARATUS, PRINTING SYSTEM, AND PRINT JOB CONTROLLING METHOD AND PROGRAM PRODUCT

This application is based on Japanese Patent Application No. Hei 11-354723 filed in Japan on Dec. 14, 1999, the entire content of which is hereby incorporated by reference.

BACKGROUND OF THE INVENTION

1. Field of the Invention

The present invention relates to a printing apparatus and the like, and more particularly, to a printing apparatus and the like capable of, when an unnecessary job is executed because of a misoperation or the like, canceling the job.

2. Description of Related Art

When instructing a printing apparatus (hereinafter, referred to as printer) to execute printing from a host apparatus such as a personal computer (hereinafter, abbreviated as PC) connected to the printer through a network or the like, the user performs an operation such as a depression of an execution key corresponding to execution of printing on the printer driver or a mouse click.

However, when such a printing execution operation is performed, in such a case that the response of the printer is low, it frequently occurs that the user erroneously determines that the print job was not transmitted and depresses the execution key again or double-clicks the mouse button.

On the printer side, even though the same print job is successively transmitted again, whether or not the print job is an unnecessary job that is transmitted by mistake cannot be determined. Therefore, the printer determines that the job is a different job from the preceding one and executes the print job. As described above, it frequently occurs that an unnecessary job is executed because of a misoperation or the like, which results in wastes of consumables and energy.

Conventionally, such an unnecessary job can be canceled only by the user himself or herself noticing the misoperation and performing a stop operation such as forcedly stopping the job on the printer side. Therefore, when the user notices the misoperation late, printing is performed before the forced stop operation is performed, so that unnecessary printing cannot be prevented.

OBJECTS AND SUMMARY

An object of the present invention is to provide an improved printing apparatus and the like that solve the above-mentioned problems.

Another object of the present invention is to provide a printing apparatus and the like with which the user can easily and reliably prevent the execution of an unnecessary print job due to a misoperation or the like.

These objects are achieved, for example, by providing a printing apparatus comprising:

first determining means for determining whether an interval between a transmission time of an externally transmitted first print job and a second print job transmitted after the first print job is within a predetermined time or not;

second determining means for determining whether the first print job and the second print job are the same or not; and confirmation information transmitting means for transmitting information for confirmation as to whether to execute the second print job or not to a transmitter of the second print job when the first determining means determines that the interval between the transmission times is within the predetermined time and the second determining means determines that the first print job and the second print job are the same.

According to this printing apparatus, when the interval between the transmission times of the first print job and the second print job is within the predetermined time and the first print job and the second print job are the same, information for confirmation as to whether to execute the second print job or not is transmitted to the transmitter of the second print job. Consequently, receiving the information, the user who transmitted an unnecessary print job because of a misoperation or the like can perform appropriate processing to immediately stop the execution of the print job. Thus, the user can easily and reliably prevent the execution of an unnecessary print job transmitted because of a misoperation or the like.

The above-described printing apparatus may be provided with the following structure: A storage device for storing therein predetermined information on the externally transmitted print job is further provided, the first determining means determines whether the interval between the transmission times is within the predetermined time or not based on the predetermined information, and the second determining means determines whether the first print job and the second print job are the same or not based on the predetermined information.

Moreover, the above-described printing apparatus may be provided with the following structure: The predetermined information includes a transmission time and a name of a transmitting user and/or print data of the print job, the storage device includes a data table in which the transmission time and the name of the transmitting user and/or the print data are recorded so as to be associated with each other, the first determining means determines whether the interval between the transmission times is within the predetermined time or not based on the transmission time recorded in the data table, and the second determining means determines whether the first print job and the second print job are the same or not based on the name of the transmitting user and/or the print data recorded in the data table.

When this structure is provided, the transmission time and the name of the transmitting user and/or print data of the print job are recorded in the data table so as to be associated with each other. Consequently, the first determining means can easily determines whether the interval between the transmission times of the first print job and the second print job is within the predetermined time or not based on the transmission time recorded in the data table and the second determining means can easily determines whether the first print job and the second print job are the same or not based on the name of the transmitting user and/or print data recorded in the data table.

Moreover, the above-described printing apparatus may be provided with the following structure: Third determining means for determining whether a size of the print data of the externally transmitted print job is larger than a predetermined size or not and calculating means for calculating a checksum of the print data when the third determining means determines that the size of the print data is larger than the predetermined size are further provided, and the second determining means determines whether the first print job and the second print job are the same or not based on the checksum calculated by the calculating means when the third determining means determines that the size of the print data is larger than the predetermined size.

When this structure is provided, in a case where the size of the print data of the transmitted print job is larger than the predetermined size, the checksum of the print data is calculated, and whether the first print job and the second print job are the same or not is determined based on the checksum. Consequently, whether the print jobs are the same or not is more easily and quickly determined.

Moreover, the above-described printing apparatus may be further provided with stopping means for stopping the execution of the second print job in a case where an instruction to stop the execution of the second print job is transmitted from the transmitter when the information for confirmation as to whether to execute the second print job or not is transmitted by the confirmation information transmitting means.

Moreover, the above-described printing apparatus may be further provided with deleting means for deleting the predetermined information stored in the storage device when no next print job is transmitted within a preset time after the transmission of the print job.

When this structure is provided, the predetermined information on the print job once stored in the storage device is deleted by the deleting means when no next print job is transmitted within the predetermined time. Consequently, accumulation of data on unnecessary print jobs in the storage device is prevented.

The predetermined time may be a fixed value or may be decided according to a value obtained by multiplying the data size of the transmitted print job by a predetermined coefficient.

In the latter case, the first determining means determines whether or not the interval between the transmission times of the first print job and the second print job is within the predetermined time decided according to the data size of the second print job. Consequently, more appropriate determination in accordance with the data size of each transmitted job can be performed.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Hereinafter, a preferred embodiment of the present invention will be described with reference to the attached drawings.

Figure 1:
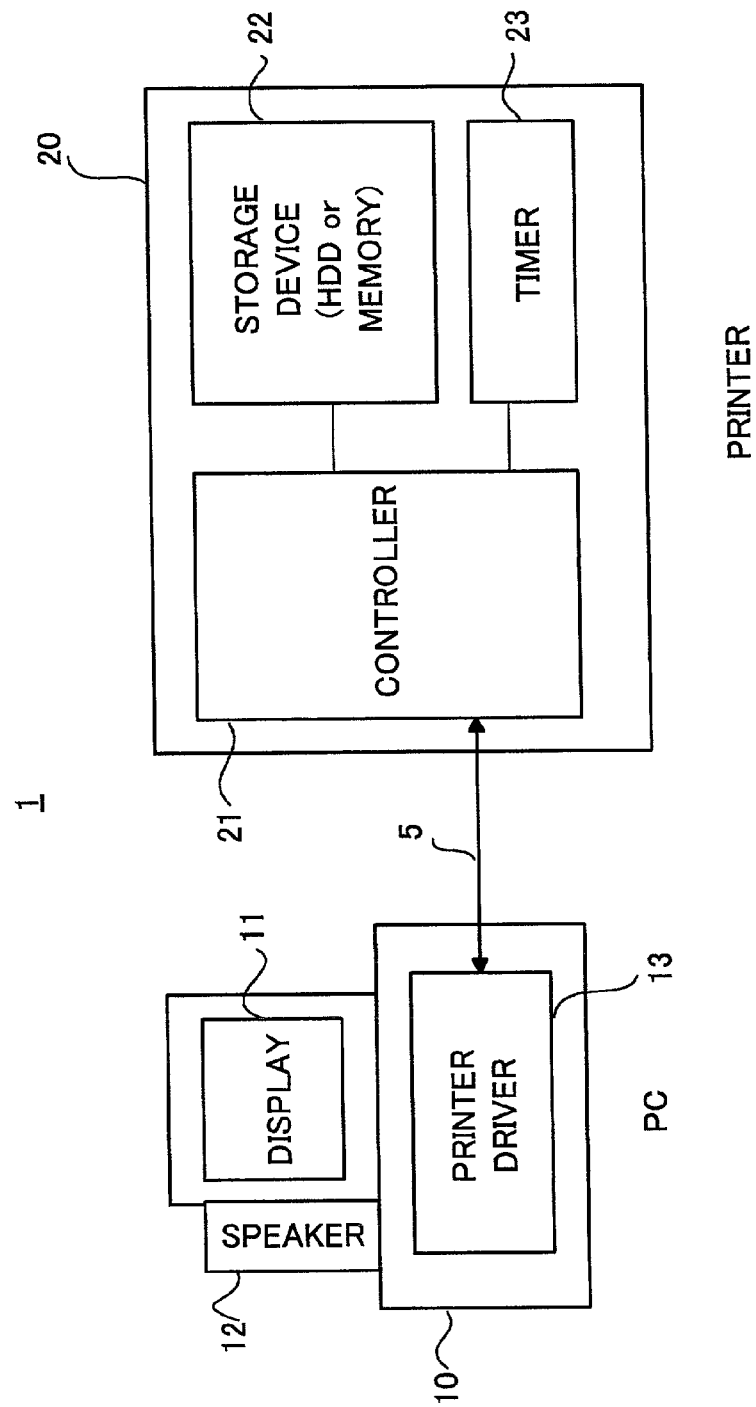
FIG. 1 is a view schematically showing the general structure of a print system 1 according to an embodiment of the present invention.

FIG. 1 is a view schematically showing the general structure of a print system 1 according to the embodiment of the present invention. Referring to FIG. 1, the print system 1 comprises a printer 20 as the printing apparatus, and a personal computer PC 10 as a data processing apparatus connected to the printer 20 through a network 5.

The PC 10 is provided with a printer driver 13 for operating the printer 20 on the PC, a display 11 for displaying information transmitted from the printer 20, and a speaker 12 for notifying the user of information transmitted from the printer 20 by sound.

The printer 20 is provided with a controller 21 for controlling the entire apparatus, a memory 22 for storing therein predetermined information on a print job transmitted from the PC 10, and a timer 23 for counting the elapsed time from the reception of a print job and the like.

The memory 22 may be a hard disk drive (HDD) or a random access memory (RAM). In the memory 22, pieces of information such as the transmission time (the time when an instruction to execute printing is provided on the side of the PC 10), the name of the transmitting user (the host name) and the print data of the transmitted print job are recorded so as to be associated with one another as a data table.

In the print system 1, a print job is transmitted from the PC 10 to the printer 20. In the printer 20, an image is formed on a sheet by a normal image forming method (for example, the electrophotographic method or the ink-jet method) in accordance with the transmitted print job.

In the printer 20, when it is determined that the transmitted print job satisfies predetermined conditions described later, that is, when it is determined that the transmitted print job is highly likely to be an unnecessary job due to a misoperation or the like, information for confirmation as to whether to execute the print job or not is transmitted to the PC 10.

Figure 2:
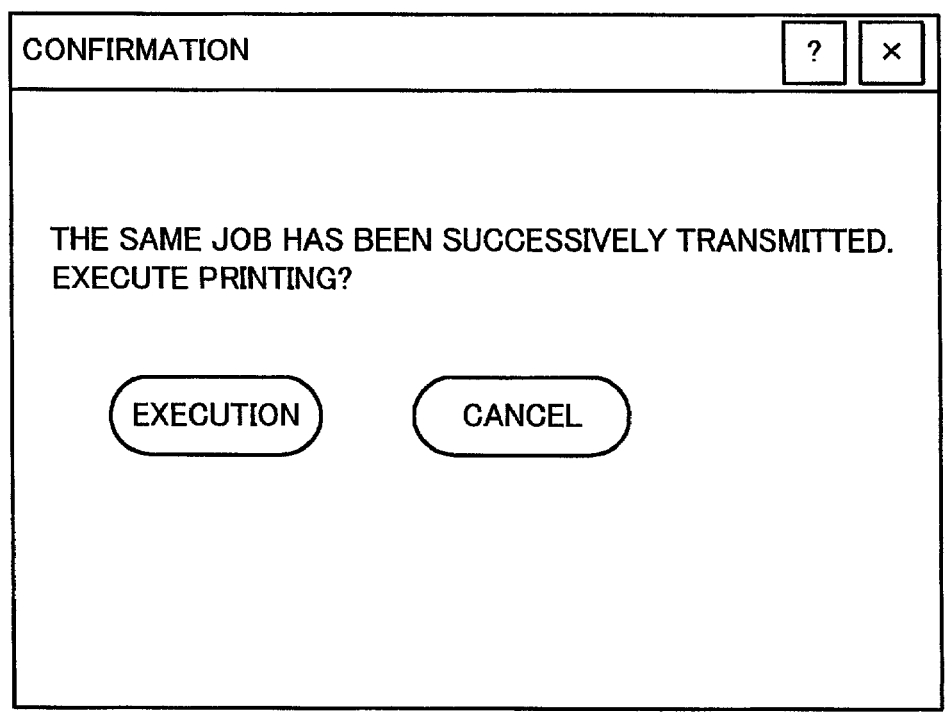
FIG. 2 is a view showing an example of a window displayed on a display 11 of a PC 10 for confirmation as to whether to execute a print job or not.

Receiving the information, the PC 10 displays a window of a content as illustrated in FIG. 2 on the display 11 to thereby ask the user to determine whether to execute the print job or not. In the case of an unnecessary print job due to a misoperation, the user can prevent unnecessary printout by choosing "Cancel."

Moreover, the confirmation as to whether to execute the print job or not may be notified to the user by sound through the speaker 12 as a sound outputter.

Next, the flow of processing performed in the print system 1 will be described with reference to FIGS. 3 and 4.

Figure 3:
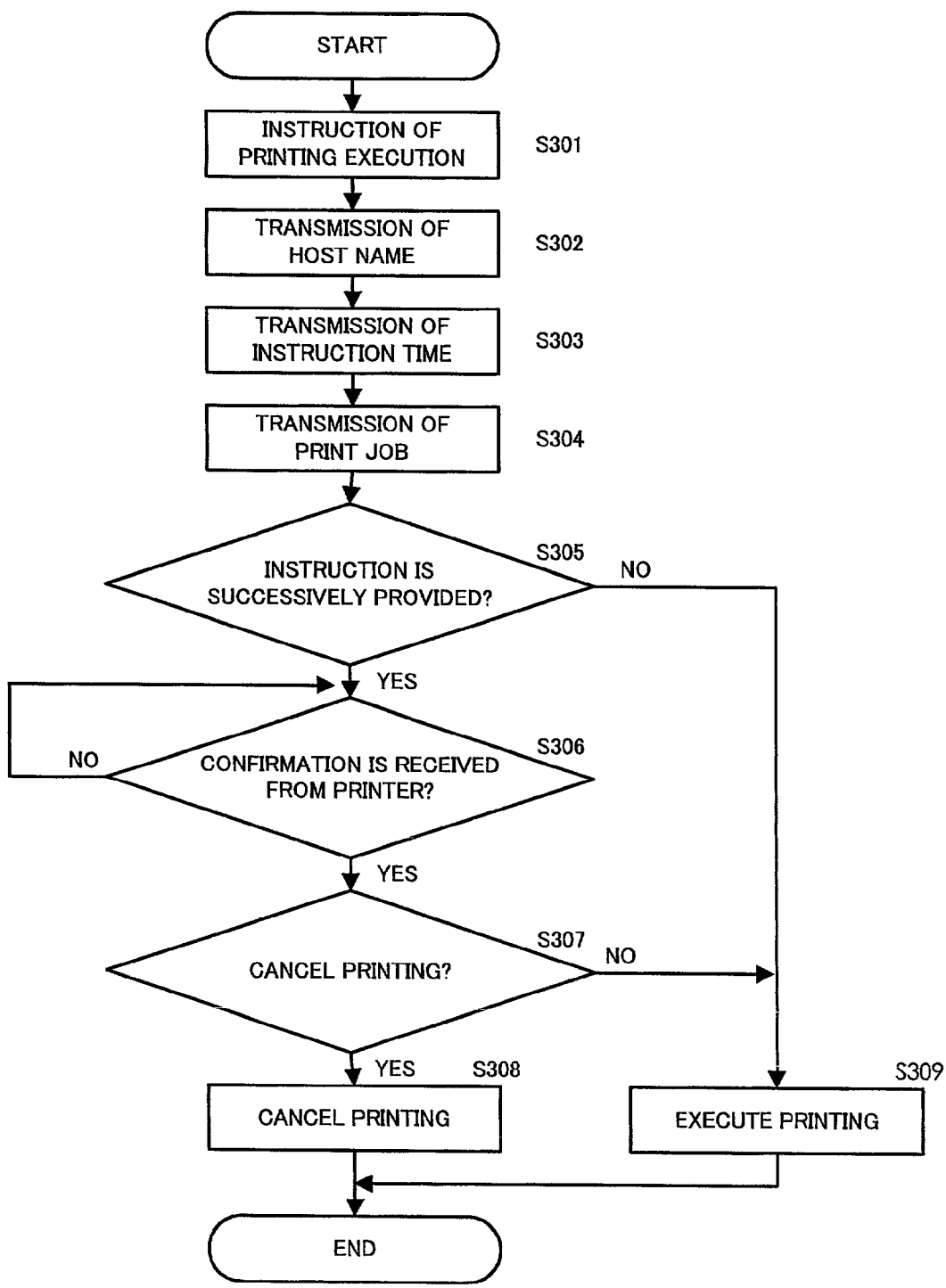
FIG. 3 is a flowchart showing the flow of processing performed in the PC 10 of the print system 1.

FIG. 3 is a flowchart showing the flow of processing performed in the PC 10 of the print system 1. Referring to FIG. 3, first, when the printer driver of the PC 10 provides an instruction to execute printing and a print job is transmitted (step S301), predetermined necessary information is transmitted to the printer 20 at steps S302 to S304.

Specifically, at step S302, the name of the host providing the printing execution instruction, that is, the name of the transmitting user is transmitted, and at step S303, the time when the printing execution instruction is provided, that is, the transmission time is transmitted. Then, at step S304, a print job including print data is transmitted.

When the printing execution instruction provided at step S301 is not one successively provided two or more times, that is, when the current printing execution instruction is provided after a certain period of time has elapsed since the provision of the preceding printing execution instruction ("NO" at step S305), at step S309, printing in the printer 20 is executed as usual.

When the printing execution instruction provided at step S301 is one successively provided two or more times, that is, when the current printing execution instruction is provided before the certain period of time has elapsed since the provision of the preceding printing execution instruction ("YES" at step S305), the process proceeds to step S306.

Then, when the information for the confirmation as to whether to execute or stop printing is transmitted from the printer 20 ("YES" at step S306), at step S307, the user determines whether to cancel printing or not.

In doing this, the PC 10 receives the information for the confirmation transmitted from the printer 20 and displays on the display 11 the window as illustrated in FIG. 2 where the user can choose between execution and cancellation. Complying with the display, the user can choose between cancellation and execution.

To urge the user to make the confirmation, sound through the speaker 12 may be used together with the display or independently of the display.

When determining, in response to the confirmation notification, that the printing execution instruction is provided because of a misoperation, the user chooses "Cancel" ("YES" at step S307). Then, the execution of printing in the printer 20 is canceled.

On the contrary, when "Execution" of printing is chosen at step S307, at step S309, printing in the printer 20 is executed as usual.

Figure 4:
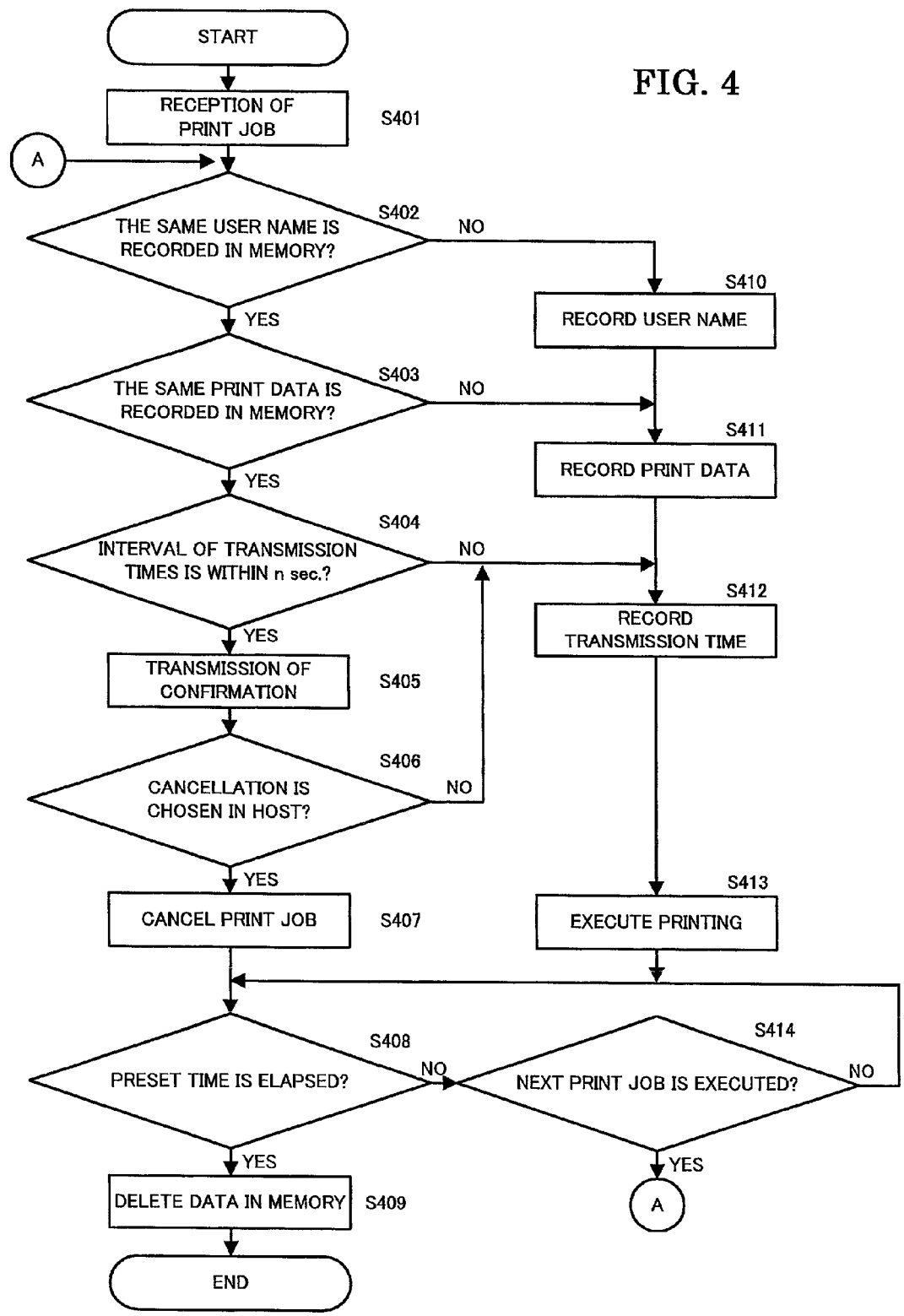
FIG. 4 is a flowchart showing the flow of processing performed in a printer 20 of the print system 1.

FIG. 4 is a flowchart showing the flow of processing performed in the printer 20 of the print system 1. Referring to FIG. 4, when a print job is received from the PC 10 (host) (step S401), whether the received print job satisfies predetermined conditions or not is determined at steps S402 to S404.

Specifically, first, at step S402, whether a transmitting user name the same as that of the received print job is recorded in the memory 22 or not is determined. When it is determined that the same transmitting user name is not recorded, at step S410, the received new transmitting user name is recorded in the memory 22, and the print data and the transmission time are also recorded so as to be associated with the transmitting user name (steps S411 and S412). Then, printing is executed in accordance with the print job as usual (step S413).

On the contrary, when it is determined at step S402 that the same transmitting user name is recorded in the memory 22, the process proceeds to step S403 to determine whether print data the same as that of the received print job is recorded in the memory 22 or not.

When it is determined that the same print data is not recorded, at step S411, the print data of the received print job is recorded so as to be associated with the transmitting user name, and the transmission time is also recorded (step S412). Then, at step S413, printing is executed in accordance with the received print job.

On the contrary, when it is determined at step S403 that the same print data is recorded in the memory 22, the process proceeds to step S404. At step S404, the transmission time recorded in the memory 22 so as to be associated with the recorded print data and the transmission time of the received print job are compared to determine whether or not the interval between the transmission time of the received print job and the transmission time recorded in the memory 22, that is, the time when the preceding print job execution instruction is provided is less than a predetermined time (n seconds). Here, a preset fixed value is used as the predetermined time (n seconds).

When it is determined that the interval is not less than the predetermined time (n seconds), at step S412, the transmission time of the received print job is recorded in the memory 22 so as to be associated with the transmitting user name and the print data. Then, at step S413, printing is executed in accordance with the received print job.

On the contrary, when it is determined at step S404 that the interval is less than the predetermined time (n seconds), at step S405, information for asking the user for the confirmation as to whether to execute printing or not is transmitted to the PC 10.

As described above, the process proceeds to step S405 only when the transmitting user name and the print data of the received print job are the same as those of the preceding print job recorded in the memory 22 and the interval between the transmission time of the received print job and the transmission time of the preceding print job is less than the predetermined time.

That is, when these conditions are satisfied, since it is highly likely that the user performed a misoperation in execution of printing, the user is asked for the confirmation as to whether to execute printing or not.

When cancellation of printing execution is not chosen in response to the confirmation ("NO" at step S406), the transmission time is recorded, and printing is executed (steps S412 and S413). When cancellation of printing execution is chosen ("YES" at step S406), at step S407, the received print job is canceled. Consequently, unnecessary printout due to an unnecessary print job is prevented.

Then, at step S408, whether a predetermined time has elapsed since the reception of the print job or not is determined based on the result of counting by the timer 23. When the predetermined time has elapsed, the data recorded in the memory 22 is deleted (steps S408 and S409). This prevents unnecessary data from being retained and accumulated in the memory 22.

When the next print job is executed before the predetermined time has elapsed ("YES" at step S414), the process returns to step S402 to repeat the above-described step S402 and succeeding steps.

According to the above-described processing, when the same print job is successively transmitted from the PC 10 to the printer 20 in a short time because of the user's misoperation or the like, the printer 20 determines that the transmitted print job is a print job requiring confirmation, and transmits to the PC 10 information for the confirmation as to whether to execute the print job or not.

Consequently, receiving the information, the user on the side of the PC 10 can choose cancellation when determining that the print job is an unnecessary job. Thus, the execution of an unnecessary job can be more reliably and easily prevented than in the case of the conventional method in which the user performs the processing to stop the execution of the job when noticing the misoperation.

While in the flowchart shown in FIG. 4, the processing to determine whether the received print job satisfies the predetermined conditions or not is performed in the order of steps S402, S403 and S404 (in the order of the transmitting user name, the print data and the transmission time), this order may be changed.

For example, the order may be changed so that first, whether the print data are the same or not is determined and then, the determinations as to the transmission time and the transmitting user name are performed, or that first, whether the print job is transmitted before the predetermined time has elapsed or not is determined and then, the determinations as to the transmitting user name and the print data are performed.

[Modification]

Next, a modification of the above-described print system 1 will be described. In the print system 1 of the above-described embodiment, as the predetermined information on the print job transmitted from the PC 10, print data is always recorded in the memory 22 as well as the transmitting user name and the transmission time. However, the modification is different in that the print data itself is not always recorded but a checksum is sometimes recorded instead.

Figure 5:
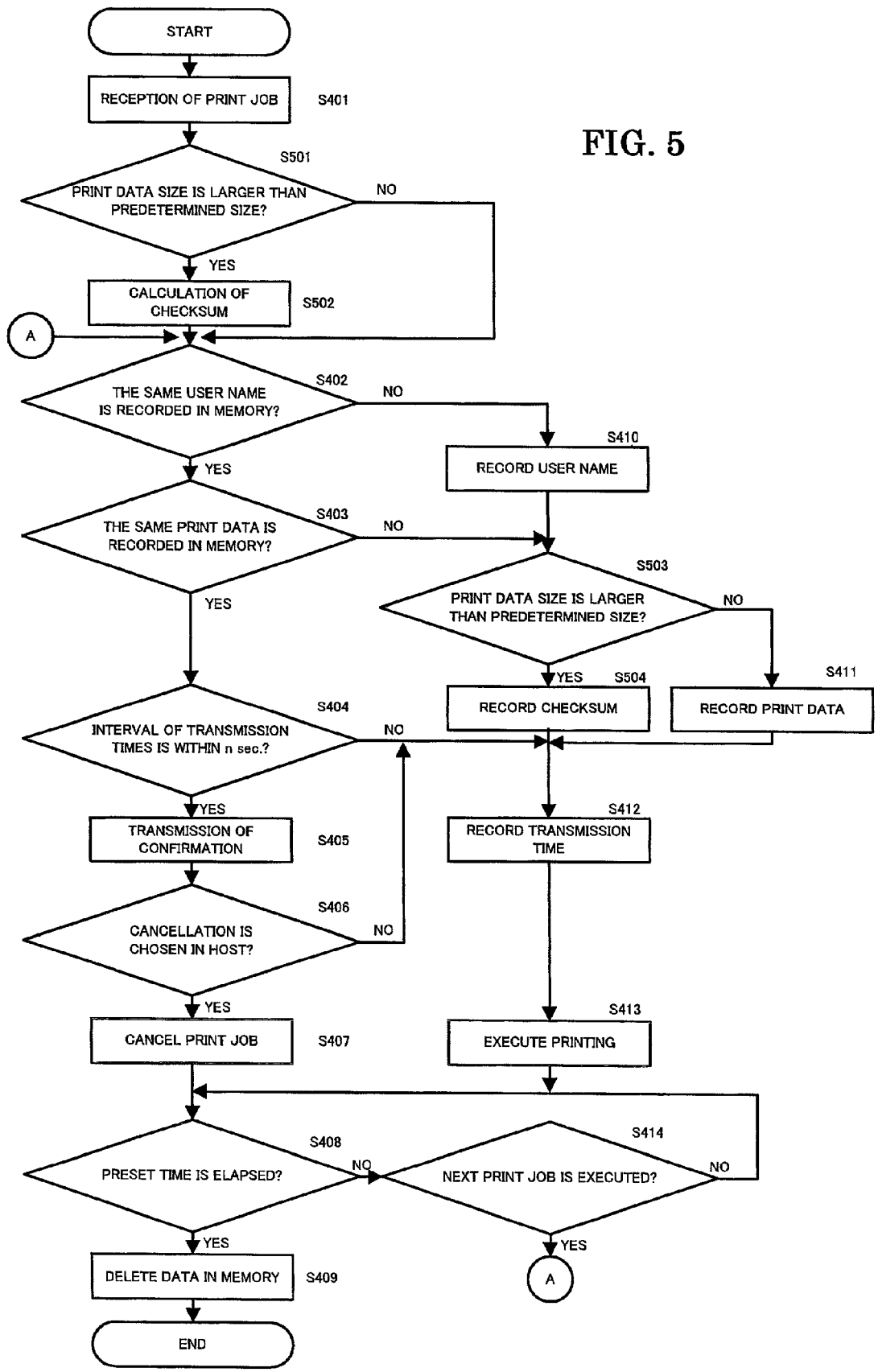
FIG. 5 is a flowchart showing the flow of processing performed in the printer 20 of the print system 1 according to a modification.

FIG. 5 is a flowchart showing the flow of processing performed in the printer 20 of the print system 1 according to the modification. Referring to FIG. 5, the flow is different from that of FIG. 4 in that steps S501 and S502 are added after step S401 and that when the result of the determination at step S403 is "NO," steps S503 and S504 are additionally performed. Hereinafter, only the different parts will be described.

When receiving a print job from the PC 10 (step S401), the printer 20 first determines whether the size of the received print data is larger than a predetermined size or not (step S501).

When the size of the print data is determined to be larger than the predetermined size, at step S502, the checksum of the print data is calculated. On the contrary, when the size of the print data is determined to be within the predetermined size, the process proceeds to step S402 without performing the calculation of the checksum. As described above, unlike FIG. 4, when the size of the print data is not less than the predetermined size, the checksum is calculated first.

Moreover, in determining whether the same print data is recorded in the memory 22 or not at step S403, comparison of the checksum is sometimes performed in addition to the comparison of the print data itself. Specifically, when the calculation of the checksum is performed at step S502, that is, when the size of the print data is large, not the print data but the checksum is compared. Then, based on this, whether the received print data and the previously recorded print data are the same or not is determined.

By comparing not the print data itself but the checksum when the size of the print data is large as described above, whether the recorded print data and the received print data are the same or not can be more quickly and easily determined.

When it is determined at step S403 that the recorded print data is different from the received print data, the process proceeds to the determination at step S503. When the size of the print data is smaller than the predetermined size, the print data is recorded in the memory 22 as usual (steps S503 and S411). However, when the size is larger than the predetermined size, the calculated checksum is recorded in the memory 22 (steps S503 and S504).

Consequently, even when the size of the transmitted print data is large, since the data recorded in the memory 22 is not the print data itself but the checksum thereof, it does not occur that the free space of the memory 22 is occupied by large-size print data.

In the case where the checksum is recorded, when an instruction to execute the next new print job is provided, whether the print data is the same or not is determined based on the checksum.

When the size of the print data of the new print job received next is not more than the predetermined size, the calculation of the checksum is not performed. Inevitably, the print data of the new print job is different from the print data of the preceding print job whose checksum is recorded.

As described above, when the size of the print data of the transmitted print job is larger than a predetermined size, by calculating the checksum and comparing the calculated checksum with the checksum of the print data of the preceding print job, whether the data is the same or not can be easily determined.

The flow of processing performed in the PC 10 of the print system 1 according to the modification is similar to the flow of processing shown in FIG. 3.

In the determination at step S404 of FIGS. 4 and 5, a fixed value is used as the predetermined time (n seconds). However, a value that varies according to the size of the print data of the print job may be used instead of a fixed value.

That is, a value obtained by obtaining the size of the print data of the print job newly transmitted at step S401 and multiplying the obtained size by an appropriate coefficient may be used as the predetermined time. By doing this, an appropriate predetermined time is decided for each print job, so that the determination as to the possibility of a misoperation can be more precisely made at step S404.

Moreover, in the flow of process shown by the flowchart of FIG. 4, when determining whether the transmitted print job is an unnecessary job or not, the printer 20 considers three conditions, step S402 (coincidence of the transmitting user names), step S403 (coincidence of the print data) and step S404 (the interval between the transmission times is less than n seconds).

However, whether the transmitted print job is an unnecessary job or not may be determined in consideration of either only the conditions of steps S402 and S404 or only the conditions of steps S403 and S404.

Specifically, according to the former combination of conditions, when the transmission time interval is less than n seconds and the transmitting user names are the same, it is determined that the transmitted print job is highly likely to be unnecessary, and according to the latter combination of conditions, when the transmission time interval is less than n seconds and the print data are the same, it is determined that the transmitted print job is highly likely to be unnecessary.

That is, in the former combination, whether the print jobs are the same or not is determined only based on the transmitting user names. Consequently, whether the transmitted print job is an unnecessary job or not can be more quickly determined than in the case where whether the print data are the same or not is also determined.

In the latter combination, whether the print jobs are the same or not is determined only based on the print data. In the case of a printer or the like not connected to a network, it is natural that the transmitting user names be the same. Therefore, in such a case, the time for performing the unnecessary determination as to whether the transmitting user names are the same or not is omitted.

By determining whether the print jobs are the same or not based on either the transmitting user name or the print data as described above, whether the transmitted job is an unnecessary job or not can be more quickly determined.

While FIG. 5 shows a case where either the checksum or the print data is recorded in the memory 22 according to the size of the print data, the present invention is not limited to this case. For example, the checksum may be always calculated irrespective of the size of the print data so that the checksum is recorded and compared.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A printing apparatus comprising:
   first determining means for determining whether an interval between a transmission time of an externally transmitted first print job and a second print job transmitted after the first print job is within a predetermined time or not;
   second determining means for determining whether the first print job and the second print job are the same or not; and
   confirmation information transmitting means for transmitting information for confirmation as to whether to execute the second print job or not to a transmitter of the second print job when the first determining means determines that the interval between the transmission times is within the predetermined time and the second determining means determines that the first print job and the second print job are the same.

2. A printing apparatus as claimed in claim 1, further comprising a storage device for storing therein predetermined information on the externally transmitted print job,
   wherein the first determining means determines whether the interval between the transmission times is within the predetermined time or not based on the predetermined information, and the second determining means determines whether the first print job and the second print job are the same or not based on the predetermined information.

3. A printing apparatus as claimed in claim 2, wherein the predetermined information includes a transmission time and a name of a transmitting user of the print job, the storage device includes a data table in which the transmission time and the name of the transmitting user are recorded so as to be associated with each other, the first determining means determines whether the interval between the transmission times is within the predetermined time or not based on the transmission time recorded in the data table, and the second determining means determines whether the first print job and the second print job are the same or not based on the name of the transmitting user recorded in the data table.

4. A printing apparatus as claimed in claim 2, wherein the predetermined information includes a transmission time and print data of the print job, the storage device includes a data table in which the transmission time and the print data are recorded so as to be associated with each other, the first determining means determines whether the interval between the transmission times is within the predetermined time or not based on the transmission time recorded in the data table, and the second determining means determines whether the first print job and the second print job are the same or not based on the print data recorded in the data table.

5. A printing apparatus as claimed in claim 2, wherein the predetermined information includes a transmission time, a name of a transmitting user and print data of the print job, the storage device includes a data table in which the transmission time, the name of the transmitting user and the print data are recorded so as to be associated with each other, the first determining means determines whether the interval between the transmission times is within the predetermined time or not based on the transmission time recorded in the data table, and the second determining means determines whether the first print job and the second print job are the same or not based on the name of the transmitting user and the print data recorded in the data table.

6. A printing apparatus as claimed in claim 1, further comprising third determining means for determining whether a size of print data of the externally transmitted print job is larger than a predetermined size or not and calculating means for calculating a checksum of the print data when the third determining means determines that the size of the print data is larger than the predetermined size,
   wherein the second determining means determines whether the first print job and the second print job are the same or not based on the checksum calculated by the calculating means when the third determining means determines that the size of the print data is larger than the predetermined size.

7. A printing apparatus as claimed in claim 1, further comprising stopping means for stopping the execution of the second print job in a case where an instruction to stop the execution of the second print job is transmitted from the transmitter when the information for confirmation as to whether to execute the second print job or not is transmitted by the confirmation information transmitting means.

8. A printing apparatus as claimed in claim 2, further comprising deleting means for deleting the predetermined information stored in the storage device when no next print job is transmitted within a preset time after the transmission of the print job.

9. A printing apparatus as claimed in claim 1, wherein the predetermined time is decided according to a value obtained by multiplying a size of print data of the print job by a predetermined coefficient.

10. A printing system comprising:
    a data processing apparatus; and
    a printing apparatus including:
       first determining means for determining whether an interval between a transmission time of an externally transmitted first print job and a second print job transmitted after the first print job is within a predetermined time or not;
       second determining means for determining whether the first print job and the second print job are the same or not; and
       confirmation information transmitting means for transmitting information for confirmation as to whether to execute the second print job or not to a transmitter of the second print job when the first determining means determines that the interval between the transmission times is within the predetermined time and the second determining means determines that the first print job and the second print job are the same.

11. A printing system as claimed in claim 10, wherein the data processing apparatus comprises a display for displaying information for confirmation as to whether to execute the second print job or not when the data processing apparatus receives the information transmitted from the confirmation information transmitting means of the printing apparatus.

12. A printing system as claimed in claim 10, wherein the data processing apparatus comprises a sound outputter for outputting sound for confirmation as to whether to execute the second print job or not when the data processing apparatus receives the information transmitted from the confirmation information transmitting means of the printing apparatus.

13. A method for controlling print jobs, the method comprising the steps of:
    1) determining whether an interval between a transmission time of an externally transmitted first print job and a second print job transmitted after the first print job is within a predetermined time or not;
    2) determining whether the first print job and the second print job are the same or not; and 3) transmitting information for confirmation as to whether to execute the second print job or not to a transmitter of the second print job when it is determined at the step 1 that the interval between the transmission times is within the predetermined time and it is determined at the step 2 that the first print job and the second print job are the same.

14. A method as claimed in claim 13, further comprising a step of storing predetermined information on the externally transmitted print job, wherein the determination of the steps 1 and 2 are performed based on the predetermined information.

15. A computer readable medium storing a computer program executable by a computer for controlling print jobs, comprising:

first determining means for determining whether an interval between a transmission time of an externally transmitted first print job and a second print job transmitted after the first print job is within a predetermined time or not;

second determining means for determining whether the first print job and the second print job are the same or not; and confirmation information transmitting means for transmitting information for confirmation as to whether to execute the second print job or not to a transmitter of the second print job when the first determining means determines that the interval between the transmission times is within the predetermined time and the second determining means determines that the first print job and the second print job are the same.

16. A computer readable medium as claimed in claim 15, further comprising means for storing in a storage device predetermined information on the externally transmitting print job, wherein the first determining means determines whether the interval between the transmission times is within the predetermined time or not based on the predetermined information, and the second determining means determines whether the first print job and the second print job are the same or not based on the predetermined information.

* * * * *